INVENTOR.
WILLIAM A. RAY
BY
Gordon H. Olson
ATTORNEY.

United States Patent Office 3,442,287
Patented May 6, 1969

3,442,287
PRESSURE REGULATOR AND SHUT-OFF VALVE
William A. Ray, North Hollywood, Calif., assignor to International Telephone and Telegraph Corporation, a corporation of Delaware
Filed June 30, 1966, Ser. No. 562,158
Int. Cl. F16k *31/145, 31/08, 31/365*
U.S. Cl. 137—489                                    13 Claims

ABSTRACT OF THE DISCLOSURE

A quiet operating valve for low pressure operation of the diaphragm type regulator and shut-off valve construction. The diaphragm carries a valve member which is biased closed by a suitable diaphragm spring. The diaphragm spring is mounted off-center from the axis of the valve seat and valve member, resulting in a tilting or pivotal motion of the valve away from the seat to open the valve. The side of the diaphragm opposite from the main valve seat is exposed to inlet pressure by means of a bleed port through the diaphragm to provide a control pressure. This control pressure is ducted through a regulator valve to the downstream side of the main valve. A solenoid plunger holds the main valve in the closed position. The solenoid plunger also holds the regulator valve closed simultaneously with the main valve.

---

This invention relates to a diaphragm type regulator and shut-off valve construction and more particularly to a quiet operating valve of this type especially suitable for low pressure operation.

Diaphragm valve constructions in which the diaphragm carries the main valve member and is subjected on one side to line inlet pressure and on its other side to a controlled pressure are widely utilized since they lend themselves to provide reliable "off" and "on" control as well as a pressure regulation function. One difficulty with such valves, particularly those operating on a low pressure differential, is that the diaphragm sometimes tends to make a loud honking noise when the valve member is close to its seat. Such noise in addition to being annoying may lead the person utilizing the valve to believe that there is something functionally wrong with the valve.

Accordingly, it is a primary object of this invention to provide an improved diaphragm valve construction which provides quiet operation during all positions of the valve and particularly under low pressure conditions.

By connecting the back side of a diaphragm carrying a valve to downstream pressure through a regulating valve a desired pressure in the output may be attained. As mentioned, the improved diaphragm valve of the invention is particularly useful in low pressure devices. While such diaphragm valve constructions must be able to operate on low pressures, a high force is desirable when the valve is to be closed to prevent leakage through the valve. It is another object of this invention to provide an improved control arrangement for a diaphragm type pressure regulating valve.

Briefly stated, the invention relates to a valve construction including a diaphragm carrying a valve member which is forced into a valve closing position by a suitable spring. In a conventional arrangement, the spring is concentrically mounted with respect to the valve member and the valve seat. Consequently, the valve member and the diaphragm move away from the valve seat in a direction entirely perpendicular to the valve seat, with the result that an undesirable noise often occurs when the valve member is positioned close to the valve seat. This problem is solved by simply mounting the diaphragm spring off-center with respect to the valve seat and valve member so that the diaphragm is then tilted off of the seat rather than being lifted normal to the axis. This provides a progressive opening of the valve and prevents sudden poppet-like actions which result in a vibratory motion on the part of the valve member, and in turn a very noisy valve.

The pressure regulation function of the diaphragm is provided by exposing the side of the diaphragm opposite from the main valve seat to inlet pressure by means of a bleed port through the diaphragm, and this control pressure is then ducted to the downstream side of the main valve through a regulator valve. Since this regulator or relief valve and the main valve are required to operate under very low pressures, the eccentric spring holding the diaphragm against its seat does not produce a very great force. Hence, unless a supplementary force is provided, the main valve may leak when it should be completely closed. To correct this situation and to provide "on-off" control, a solenoid plunger is introduced into the construction to hold the main valve in the closed position. The operation of the regulator valve is uniquely interrelated to the position of the solenoid plunger in a manner such that the regulator valve is held in a closed position when the main valve is closed by the solenoid plunger until the plunger has moved away from the main valve a predetermined amount. In this fashion, the pressure regulator function is attained and positive "off" positioning is also realized.

Further features, objects and advantages will become apparent with reference to the following specification and drawing in which.

Figure 1:
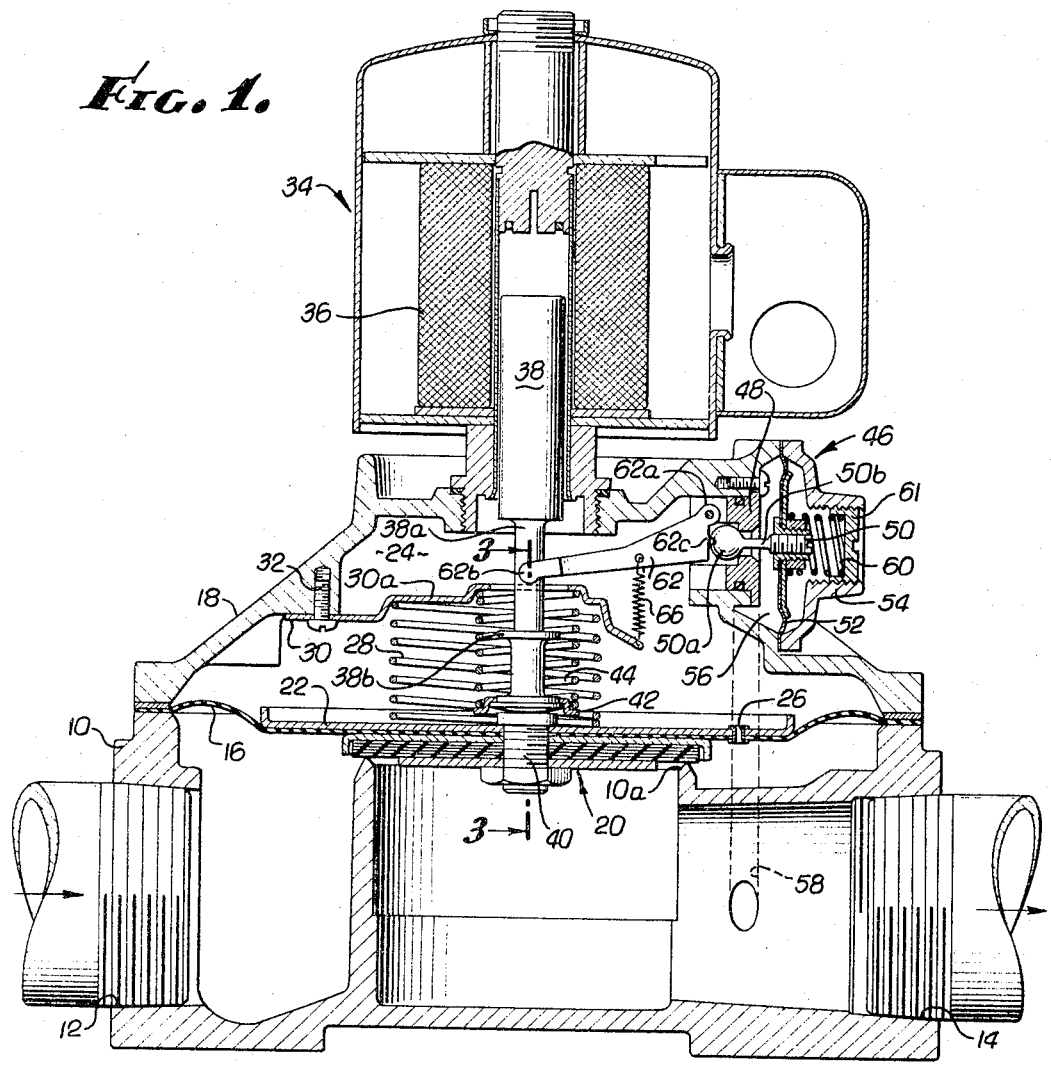
FIGS. 1 and 2 show cross-sectional views of a valve incorporating the structure of the invention.
Figure 2:
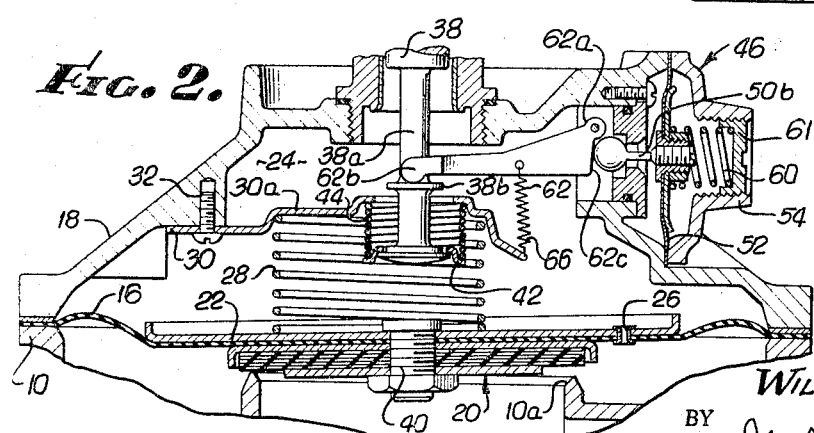

Referring first to FIGS. 1 and 2, the valve construction of the invention may be seen to include a valve body 10 having a fluid inlet 12, an outlet 14 and an annular main valve seat 10a. A flexible diaphragm 16 is clamped between valve body 10 and a cover member 18 to form a movable wall of the inlet pressure chamber. The diaphragm 16 carries a centrally mounted main valve member generally indicated at 20 mounted on the lower side of the diaphragm and a diaphragm plate 22 on the top of the diaphragm. The top side of the diaphragm defines a wall of a control chamber 24 together with the cover member 18. Inlet pressure is bled into the control chamber 24 by means of a restricted port or aperture 26 in diaphragm 16 and diaphragm plate 22. To position the main valve into a closing condition there is provided a main valve spring 28 having its lower end engaging the upper surface of the diaphragm plate 22 and its upper end engaging a bracket 30 secured to cover member 18 by means of a suitable fastener 32. Note that the bracket 30 is formed with a circular recessed portion 30a to receive the end of the valve spring.

A solenoid 34 is mounted on the upper surface of cover member 18 and includes an electromagnetic coil structure 36 adapted to control the position of a solenoid plunger 38 which extends downwardly into the control chamber to engage the upper surface of fastener 40 which clamps together diaphragm 16, plate 22 and valve member 20. An annular member 42 carried on the lower end of plunger 38 receives the lower end of a spring 44 surrounding the plunger and having its upper end engaging bracket 30 so that the plunger 38 is urged downwardly into the valve closing position. When the solenoid valve 36 is energized, the plunger 38 is moved upwardly against the downward urging of spring 44 so that the valve member 20 and the diaphragm 16 are positioned solely by the other forces reacting thereon.

To control the pressure within control chamber 24, there is provided a regulator or relief valve assembly 46 mounted in the side wall of cover member 18 including a valve seat 48 and a valve member 50 cooperating therewith. The valve member 50 includes a ball section 50a connected to a valve stem 50b which extends through valve seat 48 and is secured to a diaphragm 52 clamped between cover member 18 and element 54. One side of diaphragm 52 forms a wall of chamber 56 which is connected by passage 58 to the downstream side of the main valve as shown in FIG. 2. The opposite side of diaphragm 52 is normally open to atmosphere, however, a spring 60 extending between diaphragm 52 and plug 61 in element 54 urges diaphragm 52 into the valve opening position.

Figure 3:
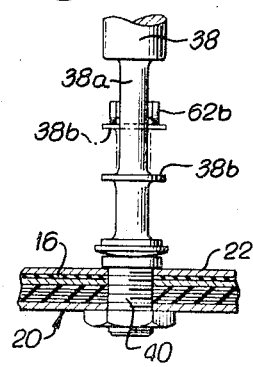
FIG. 3 is a fragmentary view of the solenoid plunger and lever end of FIG. 1.

In accordance with the invention, the operation of the regulator valve 46 is interrelated to the operation of solenoid plunger 38 by means of a lever 62. One end 62a of the lever is pivoted to cover member 18 adjacent the ball portion 50a of valve member 50, and a shoulder 62c formed on the lever engages the ball portion 50a to control the position of valve member 50 when the plunger 38 is in its lower position. The opposite end 62b of the lever is preferably bifurcated to straddle the reduced portion 38a of the plunger, as seen in FIG. 3, and is positioned to be engaged by flange 38b of plunger 38. A spring 66 extending between lever 62 and bracket 30 urges valve member 50 into its closed position.

When no flow through the main valve is desired, the solenoid 34 remains unergized and plunger 38 together with a spring 44 holds the main valve in its closed position. When the valve is to operate, the solenoid is actuated causing the plunger 38 to be moved upwardly against the urging of spring 44. If it were not for the existence of restricted port 26, the diaphragm would then be in position to move upwardly under the urging of inlet pressure if the inlet pressure is sufficient to overcome the light downward force of spring 28. Since the line pressure may often be quite low, the main valve is expected to operate under low pressure situations such as perhaps less than 1 inch of water pressure, which is approximately .036 pound per square inch. Accordingly, the downward force of spring 28 is not very great. However, since the diaphragm had been held in closed position, the pressure within control chamber 24 is essentially equal to that of inlet pressure in view of restricted port 26, and hence the main valve would remain in the closed position under such conditions.

In order to open the main valve, it is necessary to reduce the pressure within control chamber 24. This is accomplished by the regulator valve assembly 46 which is placed into operation as plunger 38 moves upwardly so that plunger flange 38b engages the end 62b of lever 62, moving it upwardly against the urging of spring 66 to thereby release valve member 50 as seen in FIG. 2. With the main valve closed, the downstream pressure would naturally be low, so that spring 60 essentially has no pressure in chamber 56 to overcome and therefore opens the regulator valve allowing the pressure in control chamber 54 to be reduced. As the pressure in control chamber 24 decreases, the inlet pressure on diaphragm 16 begins to open the main valve when the inlet pressure is sufficient to overcome the light downward pressure of spring 28 and the pressure within control chamber 24.

It will be appreciated that with such low pressures, valve member 20 will move upwardly quite slowly and possibly a very small amount. Consequently, with prior art low pressure diaphragm constructions, the diaphragm often tends to vibrate or oscillate under such conditions causing the valve to open and close producing an undesirable honking noise. In accordance with one aspect of the invention, this honking problem has been eliminated by positioning the main valve spring 28 eccentrically with respect to valve member 20 and valve seat 10a. As a result, the valve member does not move normally away from the valve seat, but instead is tilted off the seat since the downward force produced by the spring is effectively positioned at the center line of the spring whereas the upper force on the diaphragm is aligned with the center line of the valve seat.

It should be understood that the spring, valve seat and diaphragm may be offset as desired to obtain the required amount of tilting action to eliminate the noise. As one example, with a three inch diameter valve seat and a two inch main spring 28, the main spring is offset approximately 5/16 of an inch to obtain the desired action.

The main valve remains under the control of the regulator valve 46 until the solenoid is deenergized. This action causes plunger 38 to be moved downwardly under the urging of spring 44 and its own weight. As plunger flange 38b moves away from and releases lever end 62b, spring 66 pulls lever 62 about its pivot to cause shoulder 62c to close valve member 50a. The plunger 38 then continues to move downwardly to close the main valve and is assisted by the pressure buildup which occurs in chamber 24 after regulator valve 46 is closed. It is important that the regulator valve be closed first, in that if line inlet pressure is high, the plunger 38 aided by spring 44 might not be able to close the main valve if the pressure in chamber 24 remains low by virtue of valve 46 being open.

Thus, with the unique regulator valve arrangement of the invention, the main valve may be accurately controlled to maintain the desired pressure regulation while yet the solenoid construction provides positive closing action for the main valve when desired.

Figure 4:
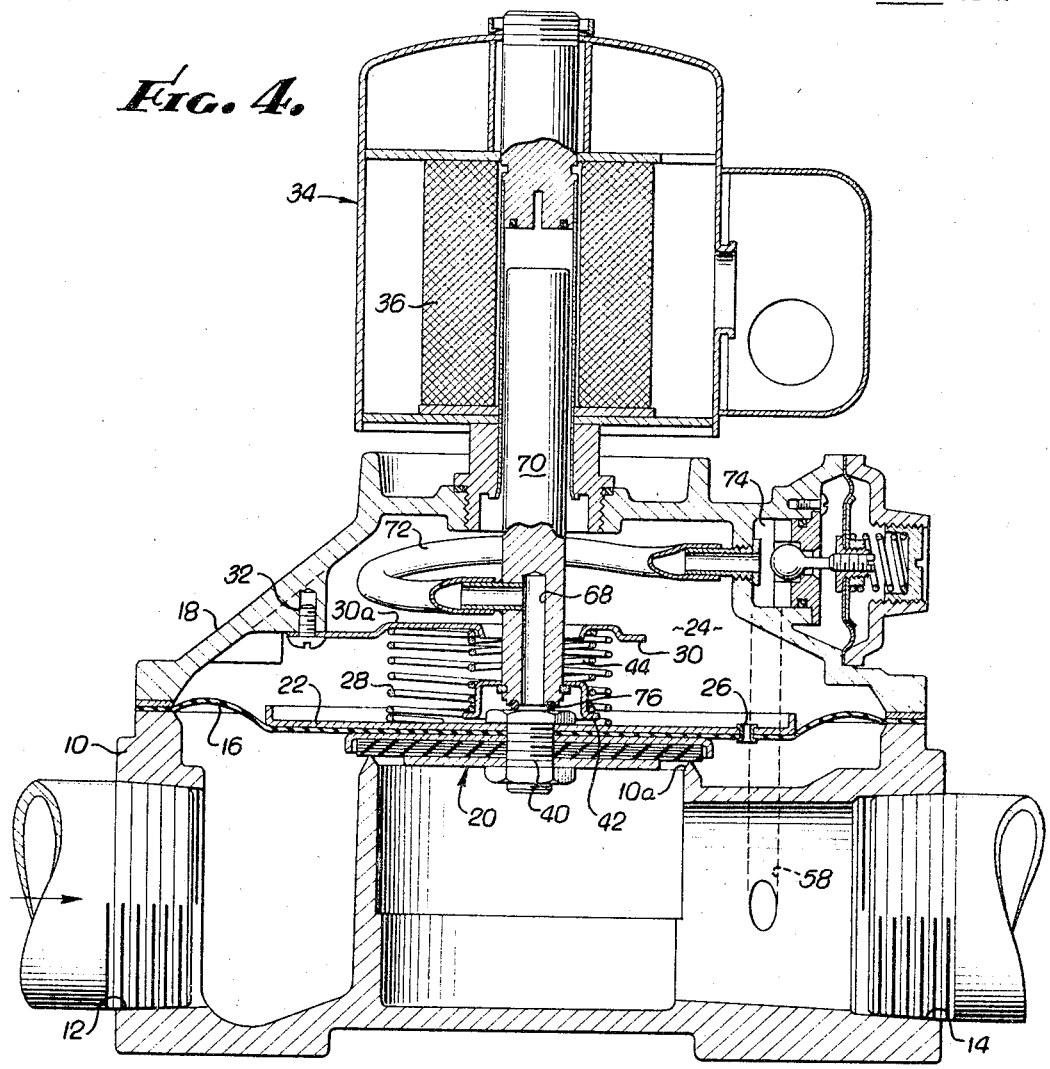
FIG. 4 shows a slightly modified control valve structure.

FIG. 4 issustrates a second arrangement for interconnecting the operation of the main valve and the regulator valve. As shown, a passage 68 is formed in the lower end of the solenoid plunger 70 and this passage is in turn connected by a conduit 72 to a chamber 74 leading to the regulator valve. Such arrangement uniquely insures that no pressure can be bled from the control chamber when the plunger is in its lower position. To minimize the possibility of leakage, a suitable O-ring or other sealing element 76 may be positioned on the bottom of the plunger. In other respects, the construction of FIG. 4 operates identically to that in the arrangement in FIGS. 1 and 2.

Thus it will be seen that a unique combination regulator and main line shut-off valve has been disclosed which is particularly useful for low pressure situations and solves the noise problem which exists in such situations.

What is claimed is:

1. A valve construction including a valve body with a valve seat therein and with an inlet and an outlet; a diaphragm carrying a valve member to cooperate with said seat, the valve member side of the diaphragm being exposed to inlet pressure;

means urging said diaphragm against said inlet pressure;

means for mounting said diaphragm and said urging means such that when said valve is opened the forces produced cause said valve member to be tilted off its seat rather than moved completely normal to the axis of the valve member to thereby prevent said diaphragm from making undesirable noise in operation, said diaphragm and valve member being concentrically maintained with respect to said valve seat, said urging means comprising a spring which produces a force parallel to but offset with respect to the axis of said valve seat, said spring being a coil spring eccentrically maintained with respect to said axis.

2. The invention of claim 1 in which the side of said diaphragm opposite the valve member forms a wall of a control chamber, and including restricted aperture means formed in said diaphragm for permitting restricted fluid flow from the inlet side of the valve to said control chamber; and a regulator valve having its inlet open to said control chamber for controlling the rate of flow from said control chamber to regulate the pressure in said control chamber and hence the position of said diaphragm.

3. The invention of claim 2 in which said regulator valve includes a valve port leading from the control chamber into a second control chamber defined in part by a movable wall, a valve element movable by said movable wall cooperating with said port to control fluid flow from said first chamber to said second chamber, said second chamber being connected to the pressure downstream of the main valve, said valve element and said movable wall being arranged such that the pressure in said second chamber urges the regulator valve closed, and a spring urging said regulator valve open.

4. The invention of claim 3 including additional means for selectively holding said diaphragm in a valve closed position.

5. The invention of claim 4 wherein said additional means comprises a solenoid having a plunger and a spring urging the plunger to hold the diaphragm in valve closed position, said solenoid spring being overcome when said plunger is moved upon energization of the solenoid.

6. The invention of claim 5 including means controlled by said plunger for preventing flow from said control chamber via said regulator valve when said plunger is holding said diaphragm in the valve closed position.

7. A valve construction including a valve body with a valve seat therein and with an inlet and an outlet; a diaphragm carrying a valve member to cooperate with said seat, the valve member side of the diaphragm being exposed to inlet pressure and the other side forming a wall of a control chamber; restricted aperture means between said inlet and said control chamber to provide communication therebetween; means urging said diaphragm and valve member toward said valve seat; conduit means interconnecting said control chamber and a space at a pressure lower than said inlet pressure; a regular valve responsive to downstream pressure controlling flow through said conduit means; means for selectively holding said diaphragm in the valve closed position; and means interconnecting said regulator valve with said holding means to prevent said regulator valve from bleeding pressure from said control chamber when said holding means is holding said diaphragm in the valve closed position.

8. The invention as defined in claim 7, wherein said restricted aperture means extends through said diaphragm, said urging means including a spring, said conduit means interconnecting said control chamber and the downstream side of said valve seat.

9. The invention of claim 8 in which said holding means comprises a plunger which engages the control chamber side of said diaphragm to hold the valve member in closed position, said plunger being axially movable away from said diaphragm to permit said diaphragm to move to the open position.

10. The invention of claim 9 in which said plunger has an axially extending passage open to the end of the plunger which engages the diaphragm structure and connected by conduit means to said regulator valve, said passage being closed when said plunger engages said diaphragm so that said regulator valve cannot bleed pressure from said control chamber when the valve member is held in closed position by said plunger.

11. The invention of claim 9 including a lever extending between said regulator valve and said plunger, one end of said lever being movable by said plunger to cause said lever to close said regulator valve, a spring urging said lever in direction to close said regulator valve, said lever being movable by said plunger against the urging of said lever spring to allow said regulator valve to open when said plunger is moved away from said diaphragm.

12. The invention of claim 11 wherein said lever under the urging of the lever spring closes said regulator valve before said plunger closes said main valve member as the plunger is moved towards said diaphragm.

13. The invention of claim 9 including a lever pivotally mounted in said valve construction, a spring urging said lever so that one end of the lever closes said regulator valve, the other end of said lever being bifurcated and positioned to straddle said plunger, said bifurcated end being engaged by a flange on said plunger as the plunger is moved away from said diaphragm so that the plunger pivots the lever to allow the regulator valve to open.

References Cited
UNITED STATES PATENTS

| | | | |
|---|---|---|---|
| 1,521,355 | 12/1924 | Burns | 251—45 |
| 1,852,033 | 4/1932 | Summers | 137—525.5 |
| 2,235,304 | 3/1941 | Toussaint | 251—45 |
| 2,388,868 | 11/1945 | Ray | 137—495 |
| 2,452,956 | 11/1948 | Robins | 251—278 XR |

FOREIGN PATENTS 73,843  7/1958  France.

M. CARY NELSON, *Primary Examiner.*

R. J. MILLER, *Assistant Examiner.*

U.S. Cl. X.R.

137—495; 251—45